Feb. 2, 1971   EMIEL-MARIA STEENACKERS ET AL   3,559,497
PAWL AND RATCHET MECHANISM
Filed Nov. 1, 1968
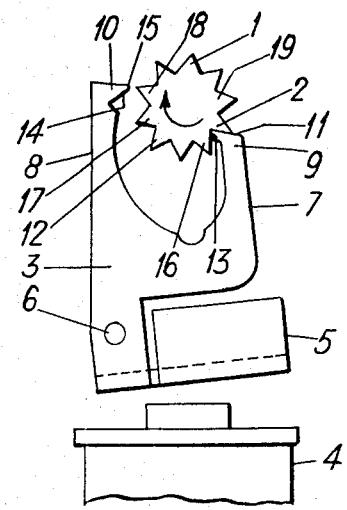
E.M. STEENACKERS
P. VAN DEN EYNDEN
R. RUELENS
Inventors
By D.D. Warner
Attorney

United States Patent Office 3,559,497
Patented Feb. 2, 1971

3,559,497
PAWL AND RATCHET MECHANISM
Emiel-Maria Steenackers, Witlebroek, Pieter van den Eynden, Ranst, and Remy Felix Ruelens, Edegem, Belgium, assignors to International Standard Electric Corporation, New York, N.Y., a corporation of Delaware
Filed Nov. 1, 1968, Ser. No. 772,708
Claims priority, application Netherlands, Nov. 3, 1967, 6714953
Int. Cl. F16h 31/00
U.S. Cl. 74—143                    5 Claims

ABSTRACT OF THE DISCLOSURE

A stepping mechanism is provided using a rotatable star wheel formed of plastic and a fork-shaped pawl. The arms of the pawl are terminated in two surfaces, one of which has about half the area of a tooth on the star wheel. The relatively small area on the pawl is chosen so that it cannot cause the star wheel to rotate in the backward direction even when it becomes sticky due to the presence of grease on it.

---

The present invention relates to a stepping mechanism of the type including a rotatable star wheel having a plurality of teeth, a fork-shaped pivoted pawl the one and other arms of which are located at the one and other sides of said star wheel, and rocking means for rocking said pawl. The rocking means rock the pawl in such a manner that during each complete rocking movement the end of said one arm is successively engaged between and removed from between adjacent teeth of said wheel, while simultaneously the end of said other arm is successively removed from between and engaged between adjacent teeth of said wheel. The wheel is thus stepped over two successive angular half steps in a predetermined direction, the engagement of an end between adjacent teeth being performed by pushing this end against the adjacent flank of one of these adjacent teeth.

A similar stepping mechanism is know from French Pat. No. 1,297,051 and more particularly from FIGS. 1 and 2 thereof. In this known mechanism the flank of said one tooth is pushed by the point of said end and when this end is completely engaged between said adjacent teeth, the one flank of said end does not make contact with said flank of said one tooth. A resulting disadvantage is that the star wheel has a position with respect to said end which is not absolutely stable, since a slight movement thereof remains possible. This known construction however has the advantage that said one flank and the adjacent flank of said one tooth cannot stick together when at least one of these flanks is spoiled with sticky matter, such as oil or grease. Thus, an erroneous rotation of the star wheel in a direction opposite to said predetermined one is impossible.

It is an object of the present invention to provide a stepping mechanism which, while exhibiting the last mentioned advantageous characteristic, does not have the previously mentioned drawback of slight looseness even when the star wheel has a small moment of inertia, i.e. when this star wheel does not oppose a large resistance to a rotation in said opposite direction, which is for instance the case when it is made out of a lightweight plastic material.

The present stepping mechanism is particularly characterised in this, that the engagement of an end between adjacent teeth is performed by pushing one flank of said end against said adjacent flank of one tooth and that when fully engaged between adjacent teeth one flank of said end has a first surface of contact with said flank of said one tooth which is comprised between one fourth and three fourths of the surface of the latter flank and the other flank of said end has a second surface of contact with a flank of the other of said adjacent teeth which is at least equal to one fourth of the surface of the latter flank.

According to another characteristic of the present stepping mechanism, said first surface is substantially equal to half the surface of the flank of said one tooth.

Such a first surface of an end is not efficient to rotate said wheel in said opposite direction when both stick together along this surface. On the other hand, since both flanks of the end make substantial contact with adjacent flanks of adjacent teeth of the star wheel, the position of this wheel is a stable one, a slight movement thereof being impossible.

It should be noted that a stepping mechanism wherein the one flank of each end makes contact with a flank of an adjacent tooth along a surface which is substantially equal to half that of the latter flank, is already known per se from FIG. 3 of the above French Pat. No. 1,297,051. This know stepping mechanism is however not of the same type as that of the present invention since the wheel is a ratchet wheel and the ends of the arms continuously remain in contact with this wheel in a push-pull operation. Consequently, when this ratchet wheel or these ends are spoiled with oil this has no effect on the rotation of the ratchet wheel.

The above mentioned and other objects and features of the invention will become more apparent and the invention itself will be best understood by referring to the following description of an embodiment taken in conjunction with the accompanying drawing, which represents a stepping mechanism according to the invention in its rest position.

This stepping mechanism forms part of a counter and includes a rotatable star wheel 1 made of a lightweight plastic material and having a number of identical teeth such as 2, a fork-shaped pawl 3 also made of a lightweight plastic material, and an electromagnet 4. Due to the star wheel 1 and the pawl 3 being made of a lightweight plastic material, they have a small moment of inertia i.e. they oppose a small resistance to rotation, for instance. The fork-shaped pawl 3 is integral with the armature 5 of the electromagnet 4 and is pivoted about axle 6. The armature 5 is maintained in the illustrated rest position by a spring (not shown). The two arms 7 and 8 of pawl 3 are located at the one and other sides of star wheel 1 and have point-shaped ends 9 and 10 respectively. End 9 of arm 7 has a flank 11 the surface of which is somewhat larger than that of the flank 12 of one of the teeth of star wheel 1 and a flank 13 the surface of which is substantially equal to half the surface of the flank 12. End 10 of arm 8 has a flank 14, the surface of which is somewhat larger than that of the flank 12 and a flank 15 the surface of which is substantially equal to half the surface of the flank 12.

The operation of the above stepping mechanism is analogous to the one described in French Pat. No. 1,297,051 (FIGS. 1 and 2) and will therefore only be briefly described hereinafter.

In the rest position of the stepping mechanism the flanks 11 and 13 of the end 9 of arm 7 make contact with the adjacent flanks of the adjacent teeth 2 and 16 respectively along surfaces which are substantially equal to the surface and half the surface of a tooth flank 12 respectively. Star wheel 1 and end 9 of arm 7 hence make contact along a relatively large surface so that this end is correctly centered between the above teeth 2 and 16. Star wheel 1 therefore has a stable position and cannot be rotated in the one or other direction about its axle of rotation.

When the electromagnet 4 is operated, its armature 5 and hence pawl 3 are pivoted in clockwise direction about axle 6 against the action of the above mentioned spring so that point-shaped end 9 of arm 7 is removed from between the adjacent teeth 2 and 16 of star wheel 1, while point-shaped end 10 of arm 3 is engaged between the adjacent teeth 17 and 18 of this star wheel 1.

Even when star wheel 1 and the end 9 of arm 7 stick to each other, e.g. due to being spoiled with oil or grease, this star wheel 1 will not erroneously rotate in counter-clockwise direction since the contact surface between the flank 13 of end 9 and the flank of the adjacent tooth 16 is too small to provoke such a rotation.

It should be noted that although the flank 11 of the end 9 of arm 7 makes contact with the flank of the adjacent tooth 2 along the whole surface thereof, this remains without effect. Indeed, even when the end 9 and tooth 2 stick to each other, the star wheel 1 will not be erroneously rotated in the counter-clockwise direction when arm 7 is moved away from this star wheel 1.

When the end 10 of arm 8 enters between the adjacent teeth 17 and 18 first flank 15 of this end 10 pushes on the adjacent flank of tooth 18 so that star wheel 1 is displaced in the clockwise direction over half an angular step. When the end 10 is fully engaged between the teeth 17 and 18, the star wheel 1 has a stable position and cannot be rotated in the one or other direction.

When electromagnet 4 is released, its armature 5 and hence pawl 3 are pivoted in counter-clockwise direction about axle 6 under the action of the releasing above mentioned spring. In an analogous manner as described above, the end 9 of arm 7 is then engaged between the adjacent teeth 2 and 19 and the end 10 of arm 8 is removed from between the adjacent teeth 17 and 18. Consequently the star wheel 1 is further displaced over half an angular step.

By one rocking movement of armature 5 and hence of pawl 3 star wheel 1 has consequently been displaced over one angular step.

It should be noted that it has been empirically found that in order that the ends 9 and 10 of the respective arms 7 and 8 should not rotate the star wheel 1 in the erroneous direction and should correctly position this star wheel 1, the surfaces of flanks 13 and 15 of these ends 9 and 10 should be comprised between ¼ and ¾ of the surface of a tooth flank, whereas the flanks 11 and 14 of these ends should at least be equal to ¼ of the surface of a tooth flank.

While the principles of the invention have been described above in connection with specific apparatus, it is to be clearly understood that this description is made only by way of example and not as a limitation on the scope of the invention.

We claim:

1. A stepping mechanism of the type including a rotatable star wheel having a plurality of teeth, a fork-shaped pivoted pawl having two arms positioned on opposite sides of said star wheel, and rocking means for rocking said pawl in such a manner that during each complete rocking movement the end of one arm is successively engaged between and removed from between adjacent teeth of said wheel, while simultaneously the end of the other arm is successively removed from between and engaged between adjacent teeth of said wheel which is thus stepped over two successive angular half steps in a predetermined direction, the engagement of an end between adjacent teeth being performed by pushing this end against the adjacent flank of one of these adjacent teeth, wherein the improvement comprises the provision of means assuring the engagement of the end of one arm of a pawl between adjacent teeth of a star wheel, said engagement being effected by pushing a first flank of the end of one arm of the pawl against one flank of a first tooth of the star wheel and pushing a second flank of the one end of one arm of the pawl against one flank of an adjacent tooth of the star wheel, said first flank of the pawl having a surface area of contact with the flank of said first tooth of the star wheel between one fourth and three fourths of the surface area of the flank of the first tooth, and said second flank of the pawl having a surface area equal to at least one fourth the surface area of the flank of the second tooth.

2. A stepping mechanism according to claim 1, in which the surface area of the first flank of the pawl is substantially equal to half the surface of the flank of said first tooth.

3. A stepping mechanism according to claim 1, in which the star wheel (1) is made out of a lightweight plastic material and has a small moment of inertia.

4. A stepping mechanism according to claim 1, in which the pawl is made out of a lightweight plastic material and has a small moment of inertia.

5. A stepping mechanism according to claim 1, in which the star wheel forms part of a counter.

References Cited
UNITED STATES PATENTS

| | | | |
|---|---|---|---|
| 1,979,028 | 10/1934 | Ewart | 74—577X |
| 2,094,122 | 9/1937 | Haselton | 74—143X |
| 2,426,715 | 9/1947 | Tatter | 74—143 |
| 3,373,622 | 3/1968 | Stautmeister | 74—143 |

FRED C. MATTERN, Jr., Primary Examiner

F. D. SHOEMAKER, Assistant Examiner

U.S. Cl. X.R.

74—577